(12) United States Patent
Konik et al.

(10) Patent No.: US 8,108,367 B2
(45) Date of Patent: Jan. 31, 2012

(54) CONSTRAINTS WITH HIDDEN ROWS IN A DATABASE

(75) Inventors: Rafal P. Konik, Oronoco, MN (US); Mark W. Theuer, Rochester, MN (US); Michael A. Venz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 12/123,905

(22) Filed: May 20, 2008

(65) Prior Publication Data

US 2009/0292711 A1    Nov. 26, 2009

(51) Int. Cl.
*G06F 7/00*    (2006.01)
(52) U.S. Cl. .......................................... 707/694; 706/19
(58) Field of Classification Search .................... None
See application file for complete search history.

(56) References Cited

U.S. PATENT DOCUMENTS

| | | | | |
|---|---|---|---|---|
| 4,933,848 | A * | 6/1990 | Haderle et al. ........................ | 1/1 |
| 5,408,657 | A * | 4/1995 | Bigelow et al. .............. | 707/822 |
| 5,513,350 | A * | 4/1996 | Griffin et al. ................ | 717/106 |
| 5,706,494 | A * | 1/1998 | Cochrane et al. .................... | 1/1 |
| 6,189,010 | B1 | 2/2001 | Isip, Jr. | |
| 6,768,985 | B1 * | 7/2004 | Plasek et al. ......................... | 1/1 |
| 7,664,790 | B2 * | 2/2010 | Blaicher et al. ........ | 707/999.202 |
| 2004/0019586 | A1 * | 1/2004 | Harter .............................. | 707/1 |
| 2004/0111394 | A1 * | 6/2004 | Fish et al. ......................... | 707/3 |
| 2005/0240615 | A1 * | 10/2005 | Barsness et al. .............. | 707/102 |
| 2005/0283485 | A1 * | 12/2005 | Blaicher et al. ............... | 707/100 |
| 2007/0050697 | A1 * | 3/2007 | Lewis-Bowen et al. ...... | 715/503 |
| 2008/0046462 | A1 * | 2/2008 | Kaufman et al. ............. | 707/102 |
| 2009/0222430 | A1 * | 9/2009 | Hobson et al. .................... | 707/5 |

OTHER PUBLICATIONS

S. Mark Klerer,"The OSI Management Architecture: an Overview," IEEE, 1998, IEEE Network, Mar. 1988 vol. 2 No. 2, pp. 20-29.*
Natalka Roshak, "Oracle FAQ's: 10gR2 New Feature: DML Error Logging," Sep. 2005, www.orafaq.com/node/76, 8 pages.*
Gayathri Gokul, "Constraints in Microsoft SQL Server 2000," Feb. 2004, www.aspfree.com—ASP Free, 8 pages.*

* cited by examiner

*Primary Examiner* — Robert Timblin
*Assistant Examiner* — Richard Bowen
(74) *Attorney, Agent, or Firm* — Owen J. Gamon

(57) ABSTRACT

In an embodiment, a constraint is created for a database table. The constraint specifies a condition for a first column in the database table and an action. The action specifies whether data that violates the condition is allowed to be stored in the first column. A value and a specification of a second column in the database table are received from a data source. If the second column is identical to the first column, the value violates the condition, and the action specifies that data that violates the condition is allowed to be stored, the value is stored in a row in the database, the row is marked as hidden, and an identification of the constraint that was violated is stored in the row. A query does not return the row that is marked as hidden.

15 Claims, 11 Drawing Sheets

```
                    USER INTERFACE (DATA SOURCE B)                    150-2
```

242 CREATE TABLE A; COLUMNS = NAME, SALARY, AGE; CONSTRAINT A;
          SALARY => 1000; ACTION = STORE/HIDE
244 ALTER TABLE A; CONSTRAINT B; SALARY <= 100000; ACTION =
          STORE/HIDE
246 LOAD TABLE A FROM DATA SOURCE A

248 ALTER TABLE A; CONSTRAINT C; AGE => 21; ACTION = STORE/HIDE

250 ALTER TABLE A; CONSTRAINT D; AGE <= 120; ACTION = REJECT

252 ALTER TABLE A; CONSTRAINT E; FOREIGN KEY = NAME; PARENT
          TABLE = TABLE B; ACTION = STORE/HIDE

254 INSERT TABLE A; NAME = DOUG; AGE = 218; SALARY = 30000
          ERROR: INPUT DATA FOR COLUMN=AGE VIOLATES CONSTRAINT D

256 INSERT TABLE A; NAME = DOUG; AGE = 18; SALARY = 30000

258 UPDATE TABLE A; NAME = BAKER; SALARY = 110000

260 QUERY TABLE A; NAME = BAKER
          ROW NOT FOUND

262 SHOW ALL HIDDEN ROWS IN TABLE A THAT VIOLATE CONSTRAINT B
          NAME = BAKER; AGE = 34; SALARY = 110000
264 SHOW ALL HIDDEN ROWS IN TABLE A
          NAME = BAKER; AGE = 34; SALARY = 110000
          NAME = DOUG; AGE = 18; SALARY = 30000
          NAME = EDIE; AGE = 19; SALARY = 40000
266 RECOMMEND CONSTRAINT CHANGE FOR CONSTRAINTS B AND C
                                IN TABLE A
          RECOMMENDATION: CHANGE CONSTRAINT B
                    TO "SALARY <= 110000"
          RECOMMENDATION: CHANGE CONSTRAINT C TO "AGE => 18"
268 ALTER TABLE A; CONSTRAINT B; SALARY <= 110000
270 VERIFY AND CHANGE ALL HIDDEN ROWS IN TABLE A THAT DO NOT
          VIOLATE CONSTRAINT B TO VIEW STATUS = READABLE
272 VERIFY AND CHANGE ALL HIDDEN ROWS THAT DO NOT VIOLATE ANY
          CONSTRAINT IN TABLE A TO VIEW STATUS = READABLE
274 DELETE ALL HIDDEN ROWS THAT VIOLATE CONSTRAINT C
276 DELETE ALL HIDDEN ROWS FROM TABLE A

FIG. 2B

DATA TABLE A     154-1

CONSTRAINTS     305

CONSTRAINT A; SALARY => 1000; ACTION = STORE/HIDE

CONSTRAINT B; SALARY <= 100000; ACTION = STORE/HIDE

CONSTRAINT C; AGE => 21; ACTION = STORE/HIDE

CONSTRAINT D; AGE <= 120; ACTION = REJECT

CONSTRAINT E; FOREIGN KEY = NAME; PARENT TABLE = TABLE B; ACTION = STORE/HIDE

DATA     310

| NAME (340) | AGE (342) | SALARY (344) | VIEW STATUS (346) | CONSTRAINT VIOLATED (348) | |
|---|---|---|---|---|---|
| ADAM | 25 | 70000 | READABLE | NONE | 320 |
| BAKER | 34 | 110000 | HIDDEN | B | 322 |
| CHARLIE | 41 | 60000 | READABLE | NONE | 324 |
| DOUG | 18 | 30000 | HIDDEN | C, E | 326 |
| EDIE | 19 | 40000 | HIDDEN | C, E | 328 |

FIG. 3

DATA TABLE B     154-2

| NAME (440) | DEPARTMENT (442) | VIEW STATUS (446) | CONSTRAINT VIOLATED (448) | |
|---|---|---|---|---|
| ADAM | ACCOUNTING | READABLE | NONE | 410 |
| BAKER | ACCOUNTING | READABLE | NONE | 412 |
| CHARLIE | MANUFACTURING | READABLE | NONE | 414 |

FIG. 4

CONSTRAINTS WITH HIDDEN ROWS IN A DATABASE

FIELD

An embodiment of the invention generally relates to constraints on the values of data stored in a database.

BACKGROUND

Computer systems typically include a combination of hardware (such as semiconductors, circuit boards, processors, and storage devices) and computer programs that are stored in the hardware and that are executed by the processors. Fundamentally, computer systems are used for the storage, manipulation, and analysis of data. One mechanism for managing data is called a database management system, which may also be called a database system or simply a database. One type of database is called a relational database, which organizes data into tables that have rows, which represent individual entries, tuples, or records in the database, and columns, fields, or attributes, which define the organization or structure of the data that is stored in each row, entry, tuple, or record. Each table has a unique name within the database and each column has a unique name within the particular table. The relational database also has an index, which is a data structure that identifies the location of a certain row in a table given an indexed column value, analogous to a book index informing the reader on which page a given word appears.

The power of the relational database flows from the fact that the relational database model uses a mathematical representation for its data, where relationships exist within the data, but the data itself is not tied to any particular view of the data or method of accessing the data. Thus, accessing the data does not rely on any built-in navigational information within the data itself, and the actions, procedures, or modules that access the data are separate from the data. Thus, the relational data may be freely indexed, queried, and accessed as a whole.

SUMMARY

A method, storage medium, and computer system are provided that, in an embodiment, create a constraint for a database table. The constraint specifies a condition for a first column in the database table and an action. The action specifies whether data that violates the condition is allowed to be stored in the first column. A value and a specification of a second column in the database table are received from a data source. If the second column is identical to the first column, the value violates the condition, and the action specifies that data that violates the condition is allowed to be stored, then the value is stored in a row in the database, the row is marked as hidden, and an identification of the constraint that was violated is stored in the row. A query does not return the row that is marked as hidden.

BRIEF DESCRIPTION OF THE DRAWINGS

Various embodiments of the present invention are hereinafter described in conjunction with the appended drawings:

FIG. 2B depicts a block diagram of another example data source, according to an embodiment of the invention.

FIG. 3 depicts a block diagram of an example data structure for a table, according to an embodiment of the invention.

FIG. 4 depicts a block diagram of another example data structure for a table, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
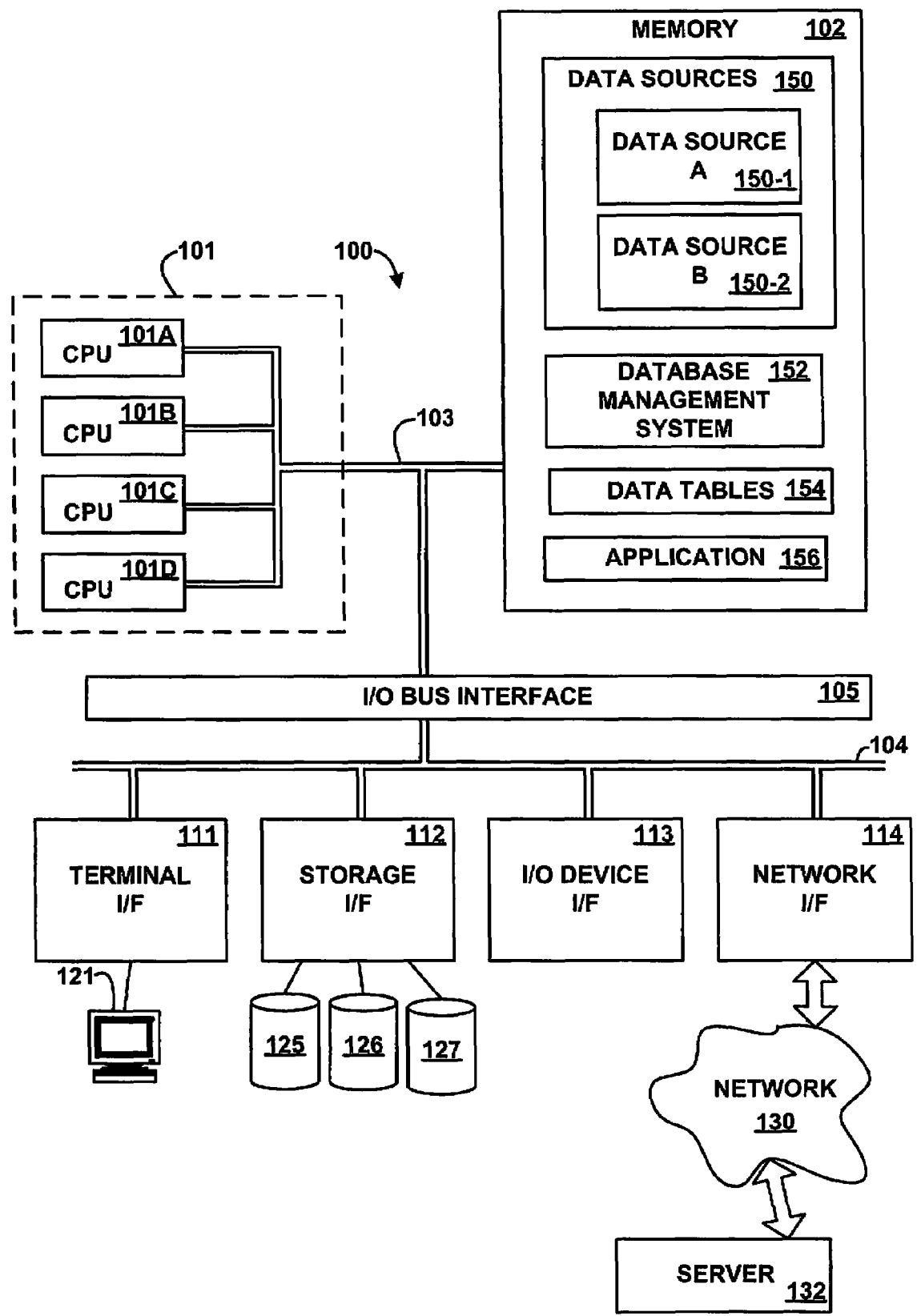
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a server computer system 132 via a network 130, according to an embodiment of the present invention. The term "server" is used herein for convenience only, and in various embodiments a computer system that operates as a client in one environment may operate as a server in another environment, and vice versa. In an embodiment, the hardware components of the computer systems 100 and 132 may be implemented by IBM System i5 computer systems available from International Business Machines Corporation of Armonk, N.Y. But, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes data sources 150, a database management system 152, data tables 154, and an application 156. Although the data source 150, the database management system 152, the data tables 154, and the application 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the data source 150, the database management system 152, the data tables 154, and the application 156 are illustrated as being contained within the main memory 102, these elements are not necessarily all completely contained in the same storage device at the same time. Further, although the data source 150, the database management system 152, the data tables 154, and the application 156 are illustrated as being separate entities, in other embodiments some of them, portions of some of them, or all of them may be packaged together.

The data source 150 is the source or originator of data that is sent to the data tables 154 via the database management system 152. The database management system 152 controls access to the data tables 154, receives commands and data from the data sources 150, stores or updates data to the data tables 154, receives commands from the application 156, retrieves data from the data tables 154, and sends data to the data sources 150 and the application 156. The data sources 150 include example data sources 150-1 and 150-2, which in various embodiments are implemented as databases, files, pipes, or user interfaces displayed via an output device of the user terminal 121 and manipulated by the user via an input device of the user terminal 121. The data source 150-1 is further described below with reference to FIG. 2A. The data source 150-2 is further described below with reference to FIG. 2B. The data tables 154 are further described below with reference to FIG. 3 and FIG. 4.

In an embodiment, the database management system 152 and the application 156 include instructions or statements capable of executing on the processor 101 or instructions or statements capable of being interpreted by instructions or statements that execute on the processor 101, to carry out the functions as further described below with reference to FIGS. 5A, 5B, 6, 7, 8, 9, 10, 11, and 12. In another embodiment, the database management system 152 and/or the application 156 are implemented in hardware via semiconductor devices, chips, logical gates, circuits, circuit cards, and/or other physical hardware devices in lieu of, or in addition to, a processor-based system. In an embodiment, the database management system 152 and/or the application 156 include data in addition to instructions or statements.

In an embodiment, the application 156 is implemented as one or more of the data sources 150. In another embodiment, the application 156 is separate from the data sources 150. In various embodiments, the application 156 is a user application, a third-party application, an operating system, or any portion, multiple, or combination thereof, that includes instructions or statements capable of executing on the processor 101 or instructions or statements capable of being interpreted by instructions or statements that execute on the processor 101. The application 156 sends query, search, or find commands to the database management system 152, which request that the database management system 152 search for or find a row or combination of rows in the data tables 154 that meet or satisfy the criteria, keys, and or values specified by the commands and return those rows to the application 156.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input to the user terminal 121 and the computer system 100, and may receive output via the user output devices. For example, a user interface may be presented via the user terminal 121, such as displayed on a display device, played via a speaker, or printed via a printer.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). In another embodiment, the devices 125, 126, and/or 127 may be implemented via any type of secondary storage device. The contents of the main memory 102, or any portion thereof, may be stored to and retrieved from the direct access storage devices 125, 126, and 127, as needed.

The I/O device interface 113 provides an interface to any of various other input/output devices or devices of other types, such as printers or fax machines. The network adapter 114 provides one or more communications paths from the computer system 100 to other digital devices and computer systems 132; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user "mainframe" computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3 specification. In another embodiment, the network 130 may be the Internet and may support IP (Internet Protocol).

In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as a GPRS (General Packet Radio Service) network. In another embodiment, the network 130 is implemented as a FRS (Family Radio Service) network. In another embodiment, the network 130 is implemented as any appropriate cellular data network or cell-based radio network technology. In another embodiment, the network 130 is implemented as an IEEE 802.11b wireless network. In another embodiment, the network 130 is implemented as any suitable network or combination of networks. Although one network 130 is shown, in other embodiments any number of networks (of the same or different types) may be present.

It should be understood that FIG. 1 is intended to depict the representative major components of the computer system 100, the network 130, and the server computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100, and that, when read and executed by one or more processors in the computer system 100 or when interpreted by instructions that are executed by one or more processors, cause the computer system 100 to perform the actions necessary to execute steps or elements comprising the various aspects of embodiments of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processor or processors, such as the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), the main memory 102, CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
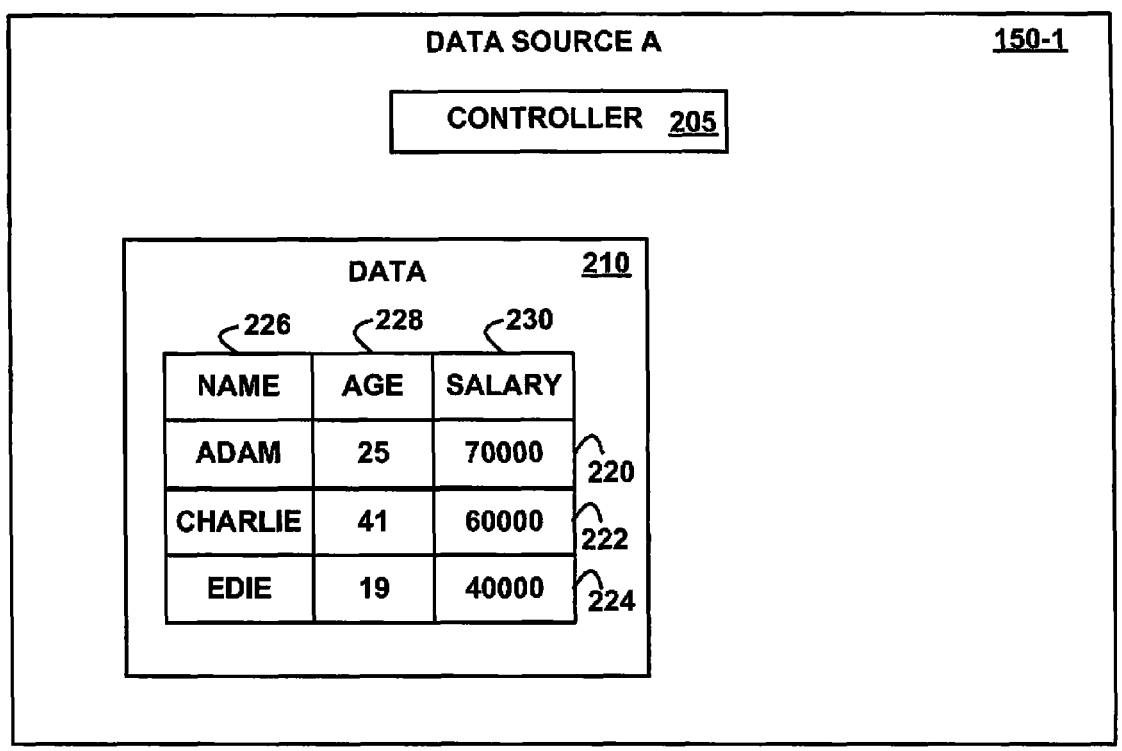
FIG. 2A depicts a block diagram of an example data source, according to an embodiment of the invention.

FIG. 2A depicts a block diagram of an example data source 150-1, according to an embodiment of the invention. The data source 150-1 includes a controller 205 and example data 210.

In an embodiment, the controller 205 includes instructions or statements capable of executing on the processor 101 or instructions or statements capable of being interpreted by instructions or statements that execute on the processor 101, to carry out the functions as further described below with reference to FIGS. 5A, 5B, 6, 7, 8, 9, 10, and 11, such as sending various commands and the data 210 or portions of the data 210 to the database management system 152. In an embodiment, the controller 205 is implemented in hardware via semiconductor devices, chips, logical gates, circuits, circuit cards, and/or other physical hardware devices in lieu of, or in addition to, a processor-based system. In various embodiments, the controller 205 performs database management system functions, performs save/restore operations, performs file operations, or performs pipe operations.

The data 210 includes example data records 220, 222, and 224, each of which includes or stores example data values in example fields or columns 226, 228, and 230. The columns 226, 228, and 230 correspond to or match columns in the data tables 154. In various embodiments, the data 210 is implemented as a relational database or a flat file.

FIG. 2B depicts a block diagram of another data source 150-2, which is implemented as a user interface presented via an I/O device, according to an embodiment of the invention. In various embodiments, the database management system 152, an operating system, or any portion or combination thereof displays the user interface on a video display screen of the user terminal 121, prints the user interface via a printer, or plays the user interface via a speaker. The database management system 152, the operating system, or any portion or combination thereof, further receives commands and data from the data source 150-2 via a keyboard of the user terminal 121, via a mouse or other pointing device, or via a microphone and a speech recognition program.

The example data source 150-2 includes example commands 242, 244, 246, 248, 250, 252, 254, 256, 258, 260, 262, 264, 266, 268, 270, 272, 274, and 276, which the user enters or submits (in the example order as listed from top to bottom), and which the data source 150-2 sends to the database management system 152 or to the database management system 152 via an operating system or other utility. In other embodiments, the user may enter and submit commands via dials, buttons, pop-up or pull-down menus, options, sliders, check boxes, a voice recognition system, or any other appropriate user interface.

FIGS. 3 and 4 depict block diagrams of example data structures for data tables 154-1 and 154-2, according to an embodiment of the invention. The data tables 154-1 and 154-2 are examples of the data table 154 (FIG. 1) and their example contents is illustrated as it existed after execution of the command 258 (FIG. 2B) and prior to execution of the command 268 (FIG. 2B).

The data table 154-1 (FIG. 3) includes constraints 305 and data 310. The constraints 305 are associated with the data 310, and the database management system 152 enforces the constraints 305 for the data that the data sources 150 request to be added to or updated in the data 310. The data 310 is organized into rows 320, 322, 324, 326, and 328, each of which represent individual entries, tuples, or records in a database, and columns, keys, fields, or attributes 340, 342, 344, 346, and 348 define the organization or structure of the data values that are stored in each row, entry, tuple, or record.

The data table 154-2 is organized into rows 410, 412, and 414, each of which represent individual entries, tuples, or records in a database, and columns, keys, fields, or attributes 440, 442, 446, and 448 define the organization or structure of the data values that are stored in each row, entry, tuple, or record. Each data table 154-1 and 154-2 has a unique name within the database and each column has a unique name within the particular table. The table 154-1 is a dependent table with a foreign key 340 that matches a parent key 440 in the parent table 154-2. The database management system 152 created the example data in the data tables 154-1 and 154-2 from the example data and commands received from the data source 150-1, as illustrated in FIG. 2A, and the data source 150-2, as illustrated in FIG. 2B.

The example command 242 (FIG. 2B) requests that the database management system 152 create a table in the data tables 154. The example command 242 specifies an identifier of the data table to be created ("table A" in this example), identifiers of the columns to be created within the table ("name," salary," and "age," in this example), and a constraint. The constraint has a name or identifier ("A," in this example) and specifies a condition ("salary=>1000," in this example) and an action ("store/hide," in this example). In response to receiving the example command 242, the database management system 152 creates the data table 154-1 and stores the constraint and action identified by the command 242 into the constraints 305 that is in or associated with the table 154-1.

A constraint is a rule that the database management system 152 enforces that constrains or restricts the data values that the database management system 152 allows to be inserted into or updated into the rows and columns of the data tables. In various embodiments, the constraint is implemented as a referential constraint, a check constraint, or any multiple or combination thereof.

A referential constraint is a logical rule regarding values in one or more columns in one or more tables that the database management system 152 enforces, in order to preserve referential integrity between columns in a table or between columns in multiple tables. Consider the example of a set of tables that shares information regarding employees of a company, with one table storing personal information that describes the employees and another table describing the organization of employees into departments. Occasionally, a new employee joins the company or an employee's name changes. A referential constraint can be defined, stating that the employee name in one table must match an employee name in another table. The referential constraint prevents inserts or updates that would otherwise result in missing or inconsistent employee names across multiple tables.

Stated more formally, referential integrity is the state of data tables in which all values of all foreign keys are valid. A foreign key is a column or a set of columns in a table whose values are required (by referential integrity) to match at least one primary key value of a row in its parent table. A referential constraint requires that the values of the foreign key are valid only if one of the following conditions is true: the foreign key value appears as a value in a row of a parent key, or some component of the foreign key is null. The table containing the parent key is called the parent table of the referential constraint, and the table containing the foreign key is called a dependent table and is said to be a dependent of the parent table. A parent key is a primary key or a unique key of a referential constraint. (A key is unique if each value in the rows of the column appears only once within the column, i.e., no duplicate values exist within that column.) A parent row is a row in a parent table that has at least one dependent row in a dependent table. A parent table is a table that contains the parent key of a referential constraint. The columns of the foreign key and its parent key match; i.e., the names of the column of the foreign key in the dependent table and the parent key in the parent table are identical.

A table may be a parent in an arbitrary number of referential constraints. A table that is the parent in a referential constraint may also be the dependent table in another referential constraint. In various embodiments, referential constraints are defined via create table or alter table commands that the data source 150 sends to the database management system 152. The database management system 152 enforces the referential constraints, as further described below, as part of the database management system 152 processing of insert and update operations, which request additions to or changes of the data values in rows of the data tables.

In response to receiving an insert operation that requests inserting data into a data table that has an associated referential constraint, the database management system 152 determines whether a non-null insert value of a foreign key (specified by the constraint) matches some value in a row of the corresponding parent key (the parent column in the parent table (specified by the constraint) that matches the dependent column in the dependent table that is specified by the command). If a non-null insert value of a foreign key matches some value of the corresponding parent key (the parent column in the parent table that matches the dependent column in the dependent table that is specified by the command), then the database management system 152 inserts the data into a row of the data table because the constraint is met. If the non-null insert value of a foreign key does not match some value of the corresponding parent key, then the database management system 152 performs the action specified by the constraint because the constraint is violated.

In response to receiving an update operation that requests the updating of data in a row in a column of the parent key in the parent table that has an associated referential constraint, the database management system 152 determines whether any row in the dependent table matches the original value of the key or if any row in the dependent table does not have a corresponding parent key in a parent table (specified by the constraint) when the update statement would be completed. If any row in the dependent table matches the original value of the key or if any row in the dependent table does not have a corresponding parent key when the update statement would be completed, then the database management system 152 performs the action specified by the constraint because the constraint is violated. If any row in the dependent table does not match the original value of the key and if every row in the dependent table would have a corresponding parent key when the update operation completes, then the database management system 152 performs the update because the constraint is met.

In response to receiving an update operation to update data in a dependent row in a dependent table, if the update specifies a foreign key (that matches a foreign key specified by the constraint) and a non-null update value of the foreign key does not match some value of the parent key of the parent table (specified by the constraint) when the update statement would be completed, then the database management system 152 performs the action specified by the constraint because the constraint is violated. If the update operation does not specify a foreign key or a non-null update value of the foreign key would match some value of the parent key of the parent table when the update operation completes, then the database management system 152 performs the update because the constrain is met.

A check constraint specifies a restriction or condition that the database management system 152 enforces or uses to decide whether to add or change a value to a table. More particularly, a check constraint is a rule that specifies the range of values that are allowed in one or more columns of every row in a table. Stated another way, the check constraint specifies a condition or criteria that all data in every row in the table in the specified column or columns must meet or satisfy, in order for the database management system 152 to insert or update the data in the table.

The database management system 152 reads the check constraint, and, in response, enforces the check constraint on the data in the table by applying the condition to each row that the database management system 152 inserts, updates, or processes in the table. The database management system 152 applies the condition by evaluating the condition to true or false after substituting the data value (which was received with the insert or update or that was read from the row) into the condition in place of the variable, key, column identifier, or placeholder specified by the condition. If the condition evaluates to true after the substitution, the database management system 152 inserts or updates the data in the table because the constraint is met or satisfied. If the condition evaluates to false, then the database management system 152 performs the action specified by the constraint because the constraint is unmet or violated. A table may have an arbitrary number of check constraints.

In various embodiments, the condition specifies any multiple, and/or combination of:

data;

columns, fields, or keys;

functions, calls, invocations, methods, classes, or applets;

relational operators (e.g., greater than, less than, equal to, not equal to, greater than or equal to, less than or equal to, or any other relational operator);

logical operators (e.g., AND, OR, XOR, NOT, NOR, NAND, or any other logical operator);

arithmetic operators (e.g., multiplication, division, addition, subtraction, bases, powers, logarithms, or any other arithmetic operators); and register operations (e.g., shift left, shift right operations, or any other register operation); and the relational operators, the logical operators, the arithmetic operators, and the register operations may have any number of arguments or operands (e.g., they may be unary, binary, ternary, or n-ary).

The action specifies the action, steps, operation, or function that the database management system 152 performs or invokes if the data requested to be inserted or updated in the data table violates, does not satisfy, or does not meet the condition specified by the constraint (e.g., if the condition specified by the constraint evaluates to false when the database management system 152 substitutes the data value into the condition). In an embodiment, the action either specifies that data that violates the constraint is to be rejected or that the data is to be stored in the data table and hidden. If the action specifies the data that violates the constraint is to be rejected, the database management system 152 does not insert or update the data, but instead the database management system 152 rejects the insert or update operation and returns an error to the requesting data source 150. If the action specifies the data that violates the constraint is to be stored and hidden, then the database management system 152 does insert or update the data to the data table, but the database management system 152 hides the data from view, meaning that, in response to a future query operation (that does not request to receive hidden data or that does not have the authority to receive hidden data) from the application 156, the database management system 152 returns an indication that the data was not found and does not return the data.

The example commands 244, 248, 250, 252, and 268 (FIG. 2B) request that the database management system 152 alter a table in the data tables 154. The example commands 244, 248, 250, 252, and 268 specify respective identifiers of data tables that are requested to be altered and identifiers of the respective constraints to be added or changed, including respective conditions and actions. The example commands 244, 248, 250, and 268 specify check constraints, and the example command 252 specifies a referential constraint, including a foreign key ("name") in a dependent table (table A) and a parent table ("table B") that has a parent key that matches the foreign key. In response to receiving the example commands 244, 248, 250, 252, and 268, the database management system 152 stores the respective constraints into the constraints 305 and enforces the constraints during the processing of future insert and update commands that are directed to the data tables.

The example command 246 (FIG. 2B) requests that the specified data source (data source "A" in this example) send insert commands and data records to the database management system 152 for insertion into the specified data table. In response to receiving the example command 246, the data source 150-1 (FIG. 2A) sends insert commands and data records to the database management system 152. The database management system 152 receives them, inserts the received records into the specified data table (if allowed by the specified data table's associated constraints), and performs the processing specified by the actions of the specified data table's associated constraints. Since all of the data records 220, 222, and 224 of the data source 150-1 (FIG. 2A) satisfy the constraints A and B (previously specified via the commands 242 and 244 of FIG. 2B), the database management system 152 inserts the data records 220, 222, and 224 into the data 310 of the data table 154-1, in response to the command 246.

The example command 254 (FIG. 2B) requests that the database management system 152 insert the specified data values into a new row in the specified table, having the respective specified columns. In response to receiving the example command 254, the database management system 152 determines that the received data meets the constraints "A," "B" and "C" (previously created via the commands 242, 244, and 248, respectively), but does not meet constraints "D" and "E" (previously created via the commands 250 and 252).

That is, the database management system 152 substitutes the data value of "30000" for the column specification "salary" in the condition specified by the constraint "A" (because the database management system 152 determines that the salary column specified by the command 254 matches the "salary" column specified by constraint A) and evaluates that the condition "30000=>1000" is true. Since the condition evaluates to true, the database management system 152 determines that the condition associated with the constraint "A" is satisfied.

The database management system 152 further substitutes the data value of "30000" for the column specification "salary" in the condition specified by the constraint "B" (because the database management system 152 determines that the "salary" column specified by the command 254 matches the salary column specified by constraint B) and evaluates that the condition "30000<=100000" is true. Since the condition specified by the constraint "B" evaluates to true, the database management system 152 determines that the condition associated with the constraint "B" is satisfied.

The database management system 152 further substitutes the data value of "218" for the column specification "age" in the condition specified by the constraint "C" (because the database management system 152 determines that the "age" column specified by the command 254 matches the "age" column specified by constraint C) and evaluates that the condition "218=>21" is true. Since the condition specified by the constraint "C" evaluates to true, the database management system 152 determines that the condition associated with the constraint "C" is satisfied.

The database management system 152 further substitutes the data value of "218" for the column specification "age" in the condition specified by constraint D (because the database management system 152 determines that the "age" column specified by the command 254 matches the "age" column specified by constraint D) and evaluates that the condition "218<=120" is false. Since the condition evaluates to false, the database management system 152 determines that the constraint D specifies a reject action, so the database management system 152 does not insert the data in the table, but instead performs the reject action specified by constraint D, which causes the database management system 152 to send an error message to the user interface 150-2, which indicates that the input data for the column of "age" violates or does not meet the condition specified by the constraint "D."

The database management system 152 further determines that the "name" column specified by the command 254 (FIG. 2B) matches the foreign key column specified by the constraint "E" (via the command 252). In response to this determination, the database management system 152 finds the parent table "B" specified by the constraint "E" and determines whether or not the parent table contains a value in its parent column of "name" (that matches the foreign key) that is the same as the value of "Doug" specified by the command 254. That is, the database management system 152 determines whether the foreign key value specified by the command 254 is present in the parent column of the parent table that is specified by the constraint "E." If the foreign key value specified by the command 254 is present in the parent column of the parent table that is specified by the constraint "E," then the database management system 152 determines that the constraint "E" is met or satisfied, but if the foreign key value specified by the command 254 is not present in the parent column of the parent table that is specified by the constraint "E," then the database management system 152 determines that the constraint "E" is unmet, unsatisfied, or violated and performs the action specified by the constraint.

In this example, "Doug" is not present in the "name" column of the data table 154-2, so the database management system 152 determines that the constraint "E" is violated and the action for the constraint "E" is store and hide. But, the data record specified by the command 254 violates both the constraint "D" and the constraint "E," and the action specified by the constraint "D" is reject while the action specified by the constraint "E" is store and hide. In an embodiment, if multiple constraints are violated, data values are only inserted or added into a row of the data table if all actions of all violated constraints specify store and hide, so the database management system sends a reject message to the data source and does not insert the data record into the data table.

The example command 256 (FIG. 2B) requests that the database management system 152 insert the specified data values into a new row in the specified table, having the respective specified columns. In response to receiving the example command 256, the database management system 152 determines that the received data meets the constraints "A," "B," and "D" because the "salary" of "30000" specified by the command 256 is greater than "1000" specified by the constraint "A," the "salary" of "30000" is less than "100000" specified by the constraint "B," and the age of "18" specified by the command 256 is less than the "age" of "120" specified by the constraint "D."

The database management system 152 also determines that the received data specified by the command 256 (FIG. 2B) violates the constraint "C" because the "age" column of "18" specified by the command 256 when substituted for the matching "age" column in the constraint "C" causes the condition of the constraint "C" to evaluate to false (18 is not greater than or equal to 21). The database management system 152 also determines that the received data specified by the command 256 violates the constraint "E." To make this determination, the database management system 152 determines that the "name" column specified by the command 256 matches the foreign key specified by the constraint "E," the database management system 152 finds the parent table 154-2 (FIG. 4) specified by the constraint "E," the database management system 152 finds the parent column "name" 440 in the parent table 154-2 that is specified by the constraint "E," and the database management system 152 determines that the value "Doug" specified by the command is not present in any of the rows in the parent column 440 of the parent table 154-2.

Since both of the constraint "C" and the constraint "E" (which were both violated by the data of the command 256) specify an action of store and hide, the database management system 152 stores the data specified by the command 256 into a new inserted row 326 in the data table 310 (FIG. 3) in the columns that correspond to and match the columns specified by the command 256, stores identifiers of the constraints "C" and "E" that were violated into the constraint violated column 348 of the inserted row 326, and stores, flags, sets, or marks an indication that the row is to be hidden from queries into the view status column 346 of the inserted row 326.

The example command 258 (FIG. 2B) requests that the database management system 152 update the specified data values into an existing row in the specified table, having the respective specified columns. In response to receiving the example command 258, the database management system 152 determines that the received data meets the constraint "E," ("Baker" is present in column 440 of the data table 154-2) but violates the constraint "B" ("110000" is not greater than or equal to "100000"). Since the constraint "B" specified an action of store and hide, the database management system 152 finds the existing row 322 in the specified data table 154-1 that has a column 340 that matches the column specified by the command 258 and a value "Baker" in that column 340 that matches the value "Baker" specified by the command, stores the received data into the columns of the existing row 322 that match the columns specified by the command 258, stores an indication that the constraint "B" was violated into the constraint violated column 348 of the row, and stores an indication that the row is to be hidden from queries into the view status column 346 of the row.

The example command 260 (FIG. 2B) requests that the database management system 152 search the specified table 154-1 (FIG. 3) for all rows that include the specified column "name" with a data value of "Baker" and return those rows to the user interface 150-2. In response to receiving the command 260, the database management system 152 searches the data 310 of the specified table 154-1, finds the row 322 that has a column that matches the column specified by the command and that has a value "Baker" that matches the value specified by the command, determines that the view status column 346 in the found row indicates that the row is to be hidden from view, and determines that the command 260 did not request to receive hidden rows, and in response, the database management system 152 returns or presents a message indicating that the row was not found to the requesting data source 150-2 (FIG. 2B), which the data source presents or displays via the user interface.

The example command 262 (FIG. 2B) requests that the database management system 152 search the specified table 154-1 (FIG. 3) for all rows that violate the specified constraint "B" and which are hidden from view. In response to receiving the command 262, the database management system 152 searches the data 310 of the specified table 154-1 and finds the row 322 that includes the constraint violated column 348, which specifies that the row 322 violates the constraint "B" (which matches the constraint specified by the command 262). The database management system 152 also determines that the found row includes the view status column 346 that indicates the found row is hidden from view and that the command 262 requested to receive hidden rows and that the data source 150-2 is authorized to receive hidden rows. In response, the database management system 152 returns to the requesting data source 150-2 (FIG. 2B) the data values in the row 322, and the data source 150-2 displays or presents the data values of the found row via the user interface.

The example command 264 (FIG. 2B) requests that the database management system 152 search the specified table 154-1 (FIG. 3) for all rows that are hidden. In response to receiving the command 264, the database management system 152 searches the data 310 of the specified table 154-1 and finds the rows 322, 326, and 328 that include values in the view status column 346 that specify that that the respective rows 322, 326, and 328 are hidden. In response, the database management system 152 returns to the requesting data source 150-2 (FIG. 2B) the data values in the rows 322, 326, and 328, and the data source 150-2 displays or presents the data values of the found row via the user interface. In an embodiment, the database management system 152 returns the rows that are hidden, in response to determining that the data source has the authority to receive hidden rows and has requested to receive hidden rows. In an embodiment, the database management system 152 returns the rows that are hidden, in response to determining that the data source 150 requested to receive hidden rows via the type of the command that the data source 150 sent or an option specified by the command.

The example command 266 (FIG. 2B) requests that the database management system 152 recommend a change from the specified current constraint in the specified table to a recommended constraint that, if implemented, would cause the data values in rows in the table that violate the current constraint to meet the recommended constraint. In response to receiving the command 266, the database management system 152 searches the data 310 of the specified table 154-1 (FIG. 3) and finds the rows that are hidden and whose data values violate the condition of the current constraint that is specified by the command 266. The database management system 152 then determines the row with an extreme data value that has the largest difference from the value that is specified by the condition of the current constraint and recommends that the current constraint be changed to a recommended constraint that would specify the extreme value.

For example, the command 266 (FIG. 2B) specifies the constraints "B" and "C," so the database management system 152 finds the rows 322, 326, and 328 (FIG. 3), which have a view status column 346 of hidden and a constraint violated column 348 that specifies the constraint "B" or the constraint "C." The database management system 152 then determines that the row 322 has the value of "110000" in the salary column 344 that matches the salary column specified by the constraint "B" and that the value of "110000" is the extreme value since it is the only value in the only found row. Thus, the database management system 152 sends a recommendation to the data source 150 that the condition "B" be changed to substitute the extreme value of "110000" for the value currently specified by the condition of the constraint "C." The database management system 152 also determines that the row 326 has a value of "18" in the "age" column, that the row 328 has a value of "19" in the "age" column, both of which violate the constraint of "age=>21," and that "18" is the extreme value because "18" has a larger amount of difference from "21" than does "19." Thus, the database management system 152 sends a recommendation to the data source 150 that the condition "C" be changed to substitute the extreme value of "18" for the value of "21" that is currently specified by the condition of the constraint "C."

The example command 268 (FIG. 2B) requests that the database management system 152 alter or change the constraint "B" to use the condition "salary<=110000," which is a new and different condition from the condition previously specified by the command 244. In response to receiving the command 268, the database management system 152 stores the received constraint in the constraints 305 (FIG. 3) and performs the processing as further described below with reference to FIG. 5B.

The example command 270 (FIG. 2B) requests that the database management system 152 change all hidden rows in the specified table that do not violate the specified constraint to a view status of readable. The database management system 152 receives and processes the command 270 as further described below with reference to FIGS. 11 and 12.

The example command 272 (FIG. 2B) requests that the database management system 152 change all hidden rows in the specified table that do not violate any constraint to a view status of readable. The database management system 152 receives and processes the command 272 as further described below with reference to FIGS. 11 and 12.

The example command 274 (FIG. 2B) requests that the database management system 152 delete all hidden rows in the specified table that violate the specified constraint. The database management system 152 receives and processes the command 274 as further described below with reference to FIG. 9.

The example command 276 (FIG. 2B) requests that the database management system 152 delete all hidden rows in the specified table. The database management system 152 receives and processes the command 276 as further described below with reference to FIG. 8.

Figure 5A:
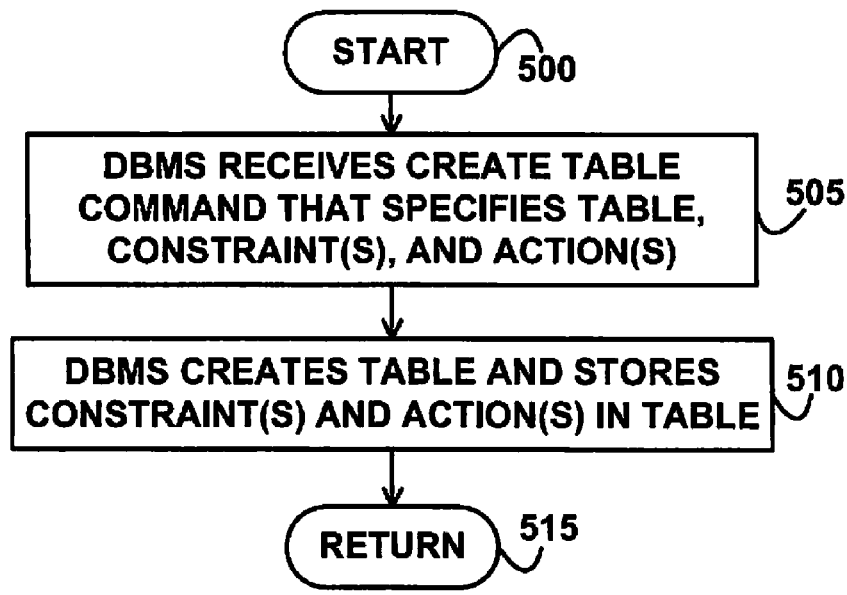
FIG. 5A depicts a flowchart of example processing for creating a constraint specified via a create table command, according to an embodiment of the invention.

FIG. 5A depicts a flowchart of example processing for creating a constraint specified when a table is created, according to an embodiment of the invention. Control begins at block 500. Control then continues to block 505 where the database management system 152 receives a create table command from the data source 150. The create command specifies a table identifier, column(s) that the table is to include, constraint(s), and action(s) specified by or associated with the respective constraints. The constraint specifies a condition and one or more of the columns of the table. The action specifies whether data that violates the condition is allowed to be stored in the column specified by the constraint or whether data that violates the condition is to be rejected.

Control then continues to block 510 where, in response to (as a result of) receiving the create command, the database management system 152 creates the table specified by the command including the specified columns and stores the constraint and its associated action in the table. Control then continues to block 515 where the logic of FIG. 5A returns.

Figure 5B:
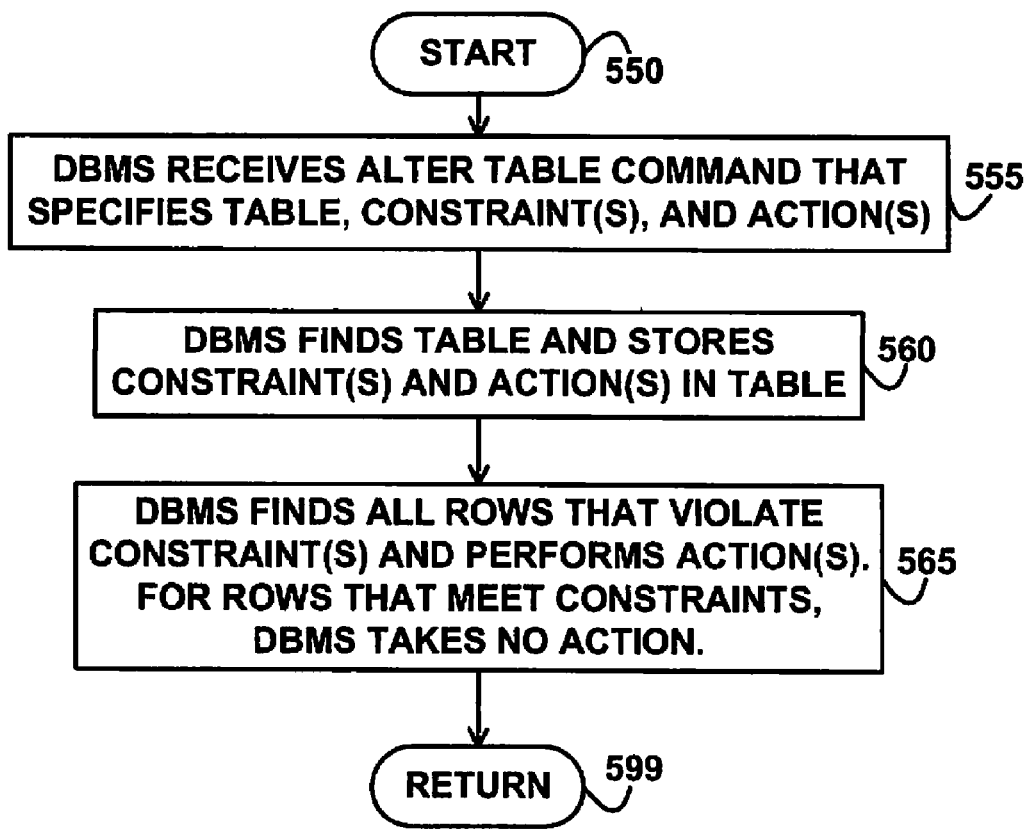
FIG. 5B depicts a flowchart of example processing for creating a constraint specified via an alter table command, according to an embodiment of the invention.

FIG. 5B depicts a flowchart of example processing for creating a constraint when a table is altered, according to an embodiment of the invention. Control begins at block 550. Control then continues to block 555 where the database management system 152 receives an alter table command from the data source 150. The alter command specifies an identifier of an existing table, constraint(s) that are requested to be added to the existing table or modified in the existing table, and optional action(s) specified by or associated with the respective constraints. The constraint specifies a condition and one or more of the columns in the table. The action specifies whether data that violates the condition is allowed to be stored in the column specified by the constraint.

Control then continues to block 560 where the database management system 152, in response to (as a result of) receiving the alter command, finds the table specified by the alter command and stores the constraint(s) and the associated action(s) in the table. Control then continues to block 565 where the database management system 152 finds all the rows in the table that violate the constraint(s) specified by the alter command and performs the action(s) specified by or associated with the constraint(s). In an embodiment, for the rows in the table that meet constraint(s) specified by the alter command, the database management system 152 takes no action or refrains from performing the action(s) specified by the respective constraints. In another embodiment, for the rows in the table that meet constraint(s) specified by the alter command, the database management system 152 performs the verify processing of FIGS. 11 and 12. Control then continues to block 599 where the logic of FIG. 5B returns.

Figure 6:
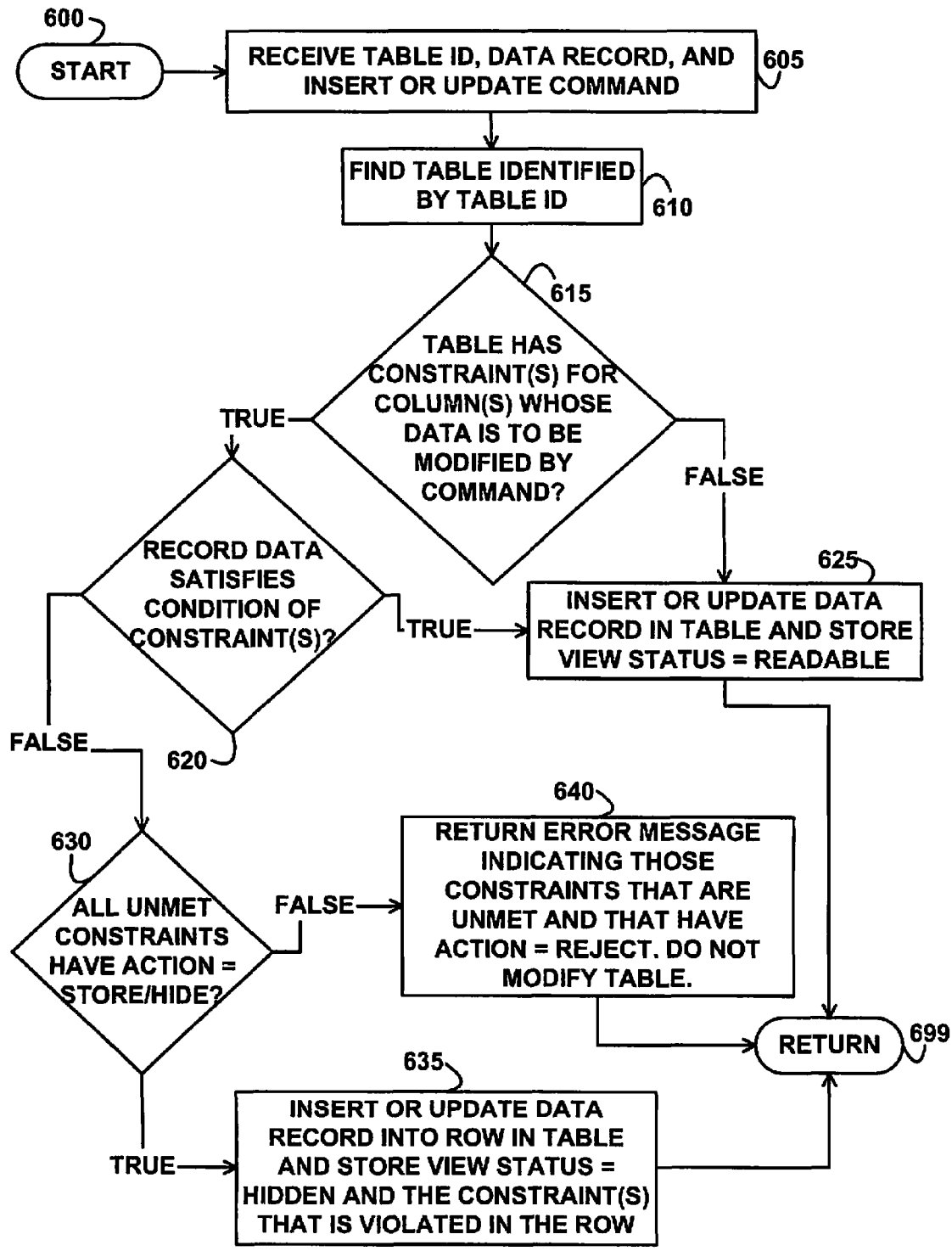
FIG. 6 depicts a flowchart of example processing for inserting and updating data in a table, according to an embodiment of the invention.

FIG. 6 depicts a flowchart of example processing for inserting and updating data in a table, according to an embodiment of the invention. Control begins at block 600. Control then continues to block 605 where the database management system 152 receives an insert or update command from a data source 150. The insert or update command specifies a table identifier and a data record. An update command specifies a key column and key value, which uniquely identifies a row in the table, which the update command desires to modify with the values in the data record. The data record includes data values and specifies associated columns of the table identified by the table identifier into which the insert or update command requests that the database management system 152 store respective data values.

Control then continues to block 610 where the database management system 152 finds the table that is identified by the table identifier. If the command is an update command, the database management system 152 finds the row identified by the command. Control then continues to block 615 where the database management system 152 determines whether the found table has, includes, or specifies a constraint for a column whose data is requested to be inserted or updated by the values in the data record specified by the received command, i.e., whether the received data record specifies a column that matches (is identical to) a column specified by the constraint.

If the determination at block 615 is true, then the table has, includes, or specifies a constraint(s) for a column whose data is requested to be inserted or updated by the values in the data record specified by the received command, so control continues to block 620 where the database management system 152 determines whether the data value in the data record satisfies or meets the condition specified by the constraint(s). For a check constraint, the database management system 152 determines whether the data value in the data record that is in the column that matches the column(s) specified by the constraint(s) causes the condition(s) to evaluate to true when the database management system 152 substitutes the value in the data record for the column(s) specific by the constraint. For a referential constraint, the database management system 152 determines whether the value of a foreign key that is specified by the constraint would be valid under the rules of referential integrity after the insert or update operation is performed, as previously described above with reference to FIGS. 2B, 3, and 4.

If the determination at block 620 is true, then the data value in the data record satisfies or meets the condition specified by the constraint(s), so control continues to block 625 where the database management system 152 stores, inserts, or updates the values from the received data record into a new row or the found row in the data table with columns in the row and table that match the columns in the data record. The database management system 152 further sets, stores, or marks the view status column 346 associated with the inserted or updated row to indicate that the row is readable, meaning that the row is capable of being found, read, and returned (to the requester as a result set) by a query, search, or find request or command. Control then continues to block 699 where the logic of FIG. 6 returns.

If the determination at block 620 is false, then the data value in the data record does not satisfy, does not meet, or violates the condition specified by the constraint(s) (the database management system 152 evaluates the condition(s) to be false when the data value is substituted for the column specified by the condition(s) or determines that the referential integrity rule is not met), so control continues to block 630 where the database management system 152 determines whether all constraints (whose column specification matches the column specified by the received command and data record) that are violated or are unmet by the received data record specify an action that indicates that values that do not meet the constraint are to be stored and hidden.

If the determination at block 630 is true, then all constraints (whose column specification matches the column specified by the received command and data record) that are violated specify an action that indicates that values that do not meet the constraint are to be stored and hidden, so control continues to block 635 where the database management system 152 inserts, or updates the values in the data record into a row in the data table with columns in the row and table that match the columns in the data record. The database management system 152 further sets, stores, or marks the view status column 346 associated with the inserted or updated row to indicate that the row is hidden, meaning that the row is incapable of being found, read, and returned (to the requester as part of a result set) by a query request or command, and stores the identifier of the constraint is not met, is not satisfied, or is violated in the constraint violated column 348. Control then continues to block 699 where the logic of FIG. 6 returns.

If the determination at block 630 is false, then at least one constraint (whose column specification matches the column specified by the received command and data record) that is violated specifies an action that indicates that values that do not meet the constraint are to be rejected, so control continues to block 640 where the database management system 152 returns or sends an error message to the data source 150 that initiated the insert or update command. The error message indicates that the received record is rejected and identifies the constraint that the data value(s) of the received record violates. The database management system 152 further does not insert the data values of the data record into a new row in the data table and does not update any existing row in the data table with the data values of the data record. Control then continues to block 699 where the logic of FIG. 6 returns.

If the determination at block 615 is false, then the table does not have, include, or specify a constraint for a column whose data is requested to be inserted or updated by the values in the data record specified by the received command, so control continues to block 625 where the database management system 152 stores, inserts, or updates the values in the data record into a row in the data table with columns in the row and table that match the columns in the data record. The database management system 152 further sets or stores the view status column 346 associated with the inserted or updated row to indicate that the row is readable, meaning that the row is capable of being found and read by a query request or command. Control then continues to block 699 where the logic of FIG. 6 returns.

Figure 7:
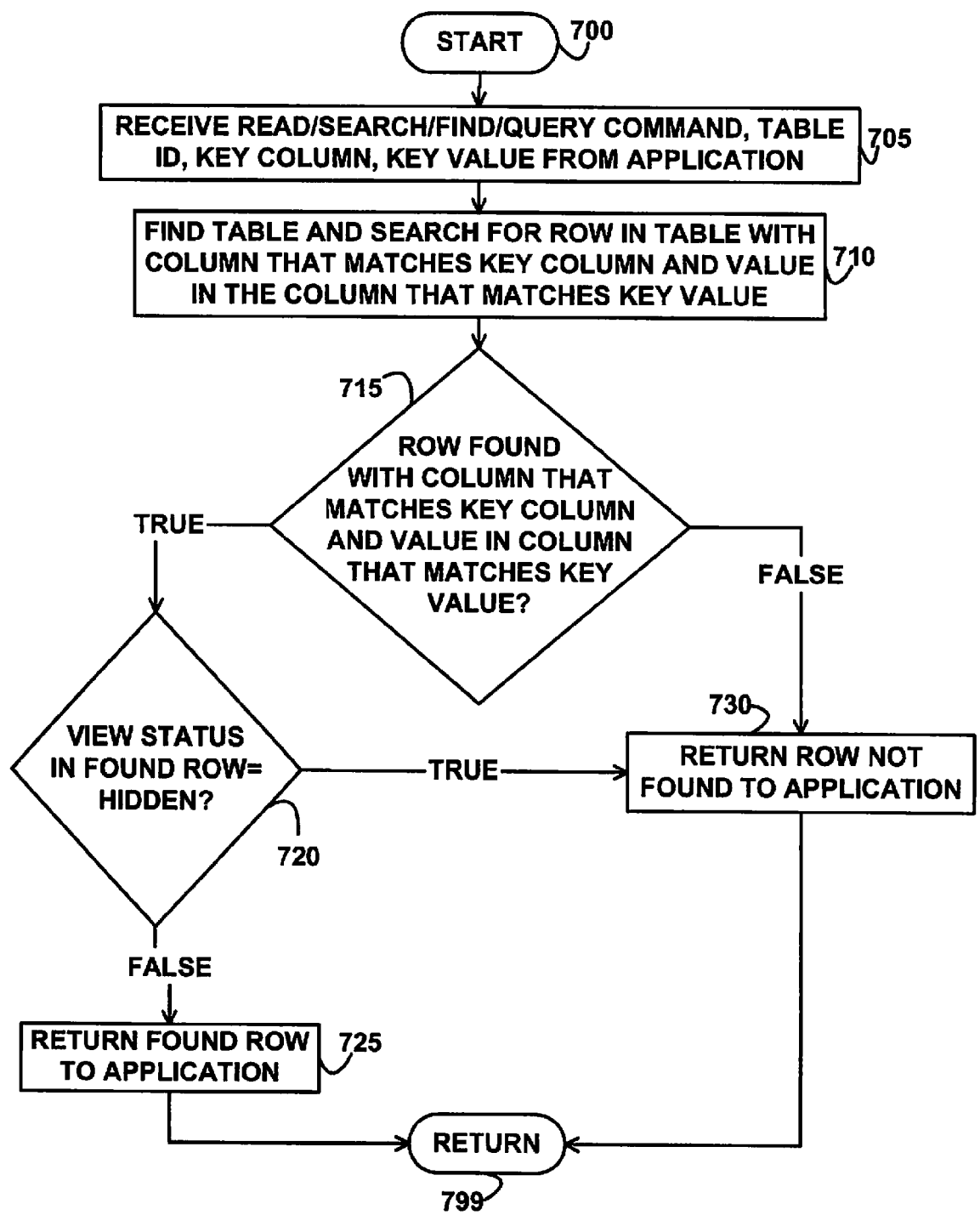
FIG. 7 depicts a flowchart of example processing for retrieving data from a table, according to an embodiment of the invention.

FIG. 7 depicts a flowchart of example processing for retrieving data from a table, according to an embodiment of the invention. Control begins at block 700. Control then continues to block 705 where the database management system 152 receives a read, search, find, or query command from the application 156. The command specifies a table identifier that identifies a data table, specifies a key column in the data table, and specifies a key value for the key column.

Control then continues to block 710 where the database management system 152 finds the data table identified by the table identifier and searches for the row in the table that includes a column that matches (is identical to) the key column and that includes a value in that column that matches the key value. Control then continues to block 715 where the database management system 152 determines whether the search found at least one row in the table that includes a column that matches (is identical to) the key column and that includes a value in that column that matches the key value.

If the determination at block 715 is true, then the search found a row in the table that includes a column that matches (is identical to) the key column and that includes a value in that column that matches the key value, so control continues to block 720 where the database management system 152 determines whether the view status column 346 of the found row(s) indicate that the found row(s) are hidden from view. In an embodiment, the database management system 152 further determines whether the application 156 lacks the authority to receive a hidden row. In another embodiment, the database management system 152 further determines whether the application 156 has not requested to receive a hidden row via a type of the received command or an option specified by the received command.

If the determination at block 720 is true, then the found row(s) includes a view status column 346 that indicates the row is hidden, and (the application 156 lacks the authority to receive a hidden row or the application 156 has not requested to receive a hidden row), so control continues to block 730 where the database management system 152 returns or sends an error message to the application 156 indicating that the row requested by the command was not found, and the database management system 152 does not return or send a row to the application 156. Control then continues to block 799 where the logic of FIG. 7 returns.

If the determination at block 720 is false, then the found row(s) include a view status column 346 that indicates the row(s) are readable (not hidden) or (the row(s) are hidden and the application 156 has the authority to receive a hidden row) or (the row(s) are hidden and the application 156 has requested to receive a hidden row), so control continues to block 725 where the database management system 152 returns or sends the found row(s) to the application 156. The application 156 receives the found row(s) and stores or presents the data values of the found row(s). Control then continues to block 799 where the logic of FIG. 7 returns.

If the determination at block 715 is false, then the search did not find any row in the table that includes a column that matches (is identical to) the key column and that includes a value in that column that matches the key value, so control continues to block 730 where the database management system 152 returns or sends an error message to the application 156 indicating that the row requested by the command was not found, and the database management system 152 does not return or send a row to the application 156. Control then continues to block 799 where the logic of FIG. 7 returns.

Figure 8:
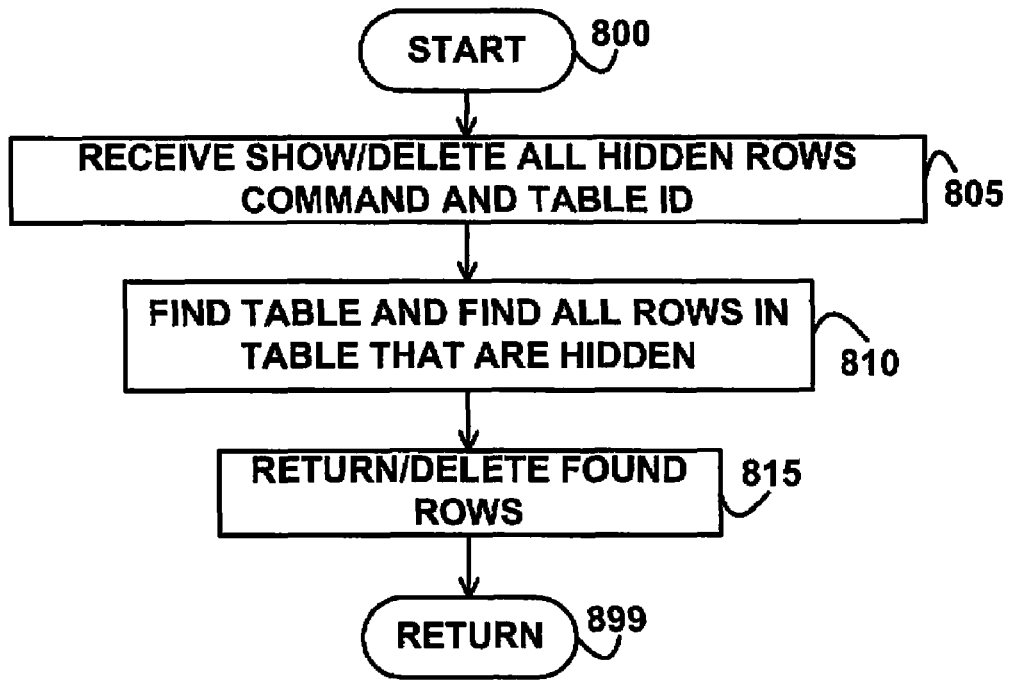
FIG. 8 depicts a flowchart of example processing for showing and deleting hidden rows, according to an embodiment of the invention.

FIG. 8 depicts a flowchart of example processing for showing and deleting hidden rows, according to an embodiment of the invention. Control begins at block 800. Control then continues to block 805 where the database management system 152 receives a show command from the data source 150, and the show command specifies or identifies a table and requests that all hidden rows be in the table be retrieved. In another embodiment, the database management system 152 receives a delete command from the data source 150, and the delete command specifies a table and requests that all hidden rows in the table be deleted. Control then continues to block 810 where the database management system 152 finds the table specified by the received command and finds all rows in the table that include a view status column 346 that indicates that the row is hidden. Control then continues to block 815 where the database management system 152 returns all of the found rows to the data source 150 in response to the show command or deletes all of the found rows in response to the delete command. Control then continues to block 899 where the logic of FIG. 8 returns.

Figure 9:
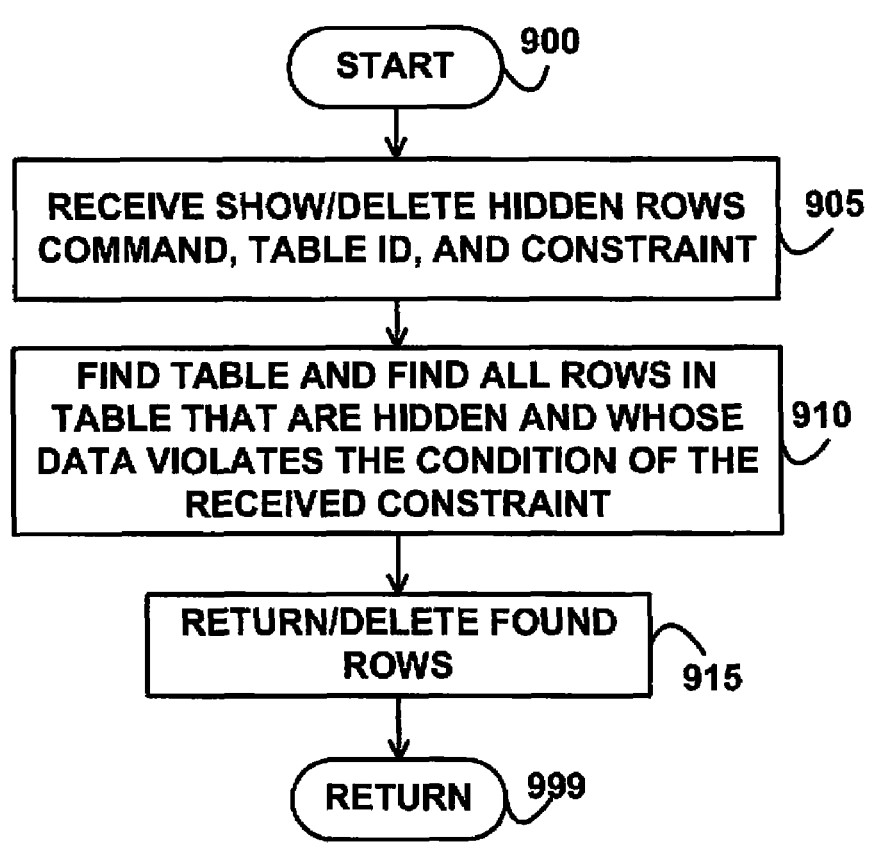
FIG. 9 depicts a flowchart of example processing for showing and deleting hidden rows that violate constraints, according to an embodiment of the invention.

FIG. 9 depicts a flowchart of example processing for showing and deleting hidden rows that violate constraints, according to an embodiment of the invention. Control begins at block 900. Control then continues to block 905 where the database management system 152 receives a show command from the data source 150, and the show command specifies or identifies a table and specifies or identifies constraint and requests that all hidden rows in the table that violate the specified constraint retrieved. In another embodiment, the database management system 152 receives a delete command from the data source 150, and the delete command specifies a table and a constraint and requests that all hidden rows in the table that violate the constraint be deleted. Control then continues to block 910 where the database management system 152 finds the table specified by the received command and finds all rows in the table that include a view status column 346 that indicates that the row is hidden and whose constraint violated column 348 indicates a constraint that matches the specified constraint, indicating that the data values of the found row violate the specified constraint. Control then continues to block 915 where the database management system 152 returns all of the found rows to the data source 150 in response to the show command or deletes all of the found rows in response to the delete command. Control then continues to block 999 where the logic of FIG. 9 returns.

Figure 10:
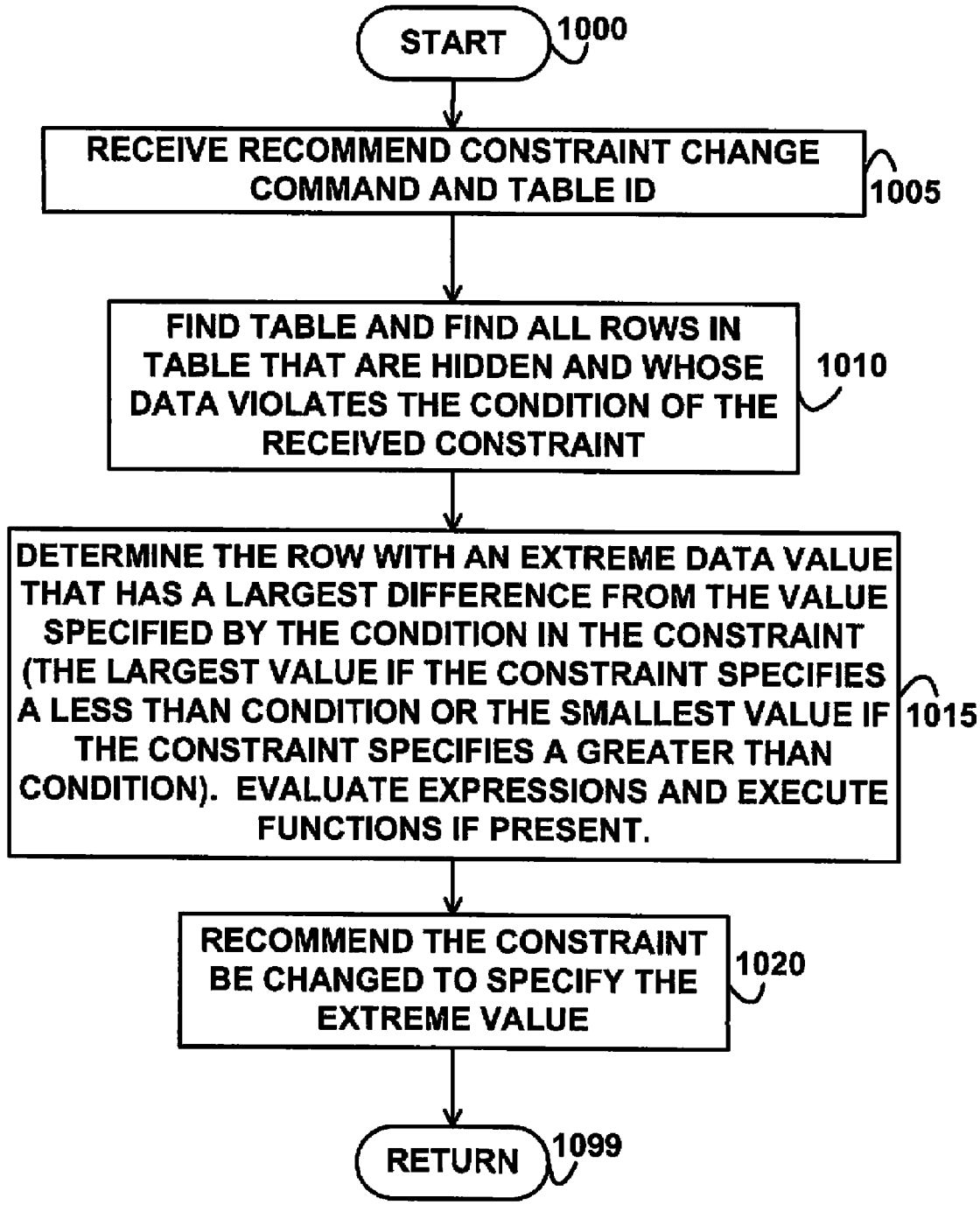
FIG. 10 depicts a flowchart of example processing for recommending constraints, according to an embodiment of the invention.

FIG. 10 depicts a flowchart of example processing for recommending constraints, according to an embodiment of the invention. Control begins at block 1000. Control then continues to block 1005 where the database management system 152 receives a recommend constraint change command from the data source 150. The recommend constraint change command identifies a table and constraint(s). Control then continues to block 1010 where the database management system 152 finds the table identified by the received command and finds all rows in the table that have a view status indicating that the row is hidden and have a constraint violated column that identifies a constraint that matches the constraint specified by the received command, indicating that the found row includes data values that violate the condition specified by the received constraint.

Control then continues to block 1015 where the database management system 152 determines the found row that has an extreme data value, which has the largest different from the value specified by the condition of the constraint. In an embodiment, if the constraint specifies a less than or a less than or equal to condition, then the extreme value is the largest data value in the column (that matches the column specified by the constraint) in the found rows. In an embodiment, if the constraint specifies a greater than or a greater than or equal to condition, then the extreme value is the smallest data value in the column (that matches the column specified by the constraint) in the found rows. In an embodiment, the database management system 152 determines the extreme value by calculating the absolute value of the difference between each of the values in the found rows and the value specified by the condition and by selecting the value whose absolute value of the difference is the largest. In an embodiment, the database management system 152 evaluates any expressions and executes any functions if present in the constraint when determining the extreme value.

Control then continues to block 1020 where the database management system 152 sends a recommendation and the extreme value to the data source 150. The recommendation recommends that the constraint be changed to specify the extreme value instead of the current value specified by the constraint. Control then continues to block 1099 where the logic of FIG. 10 returns.

Figure 11:
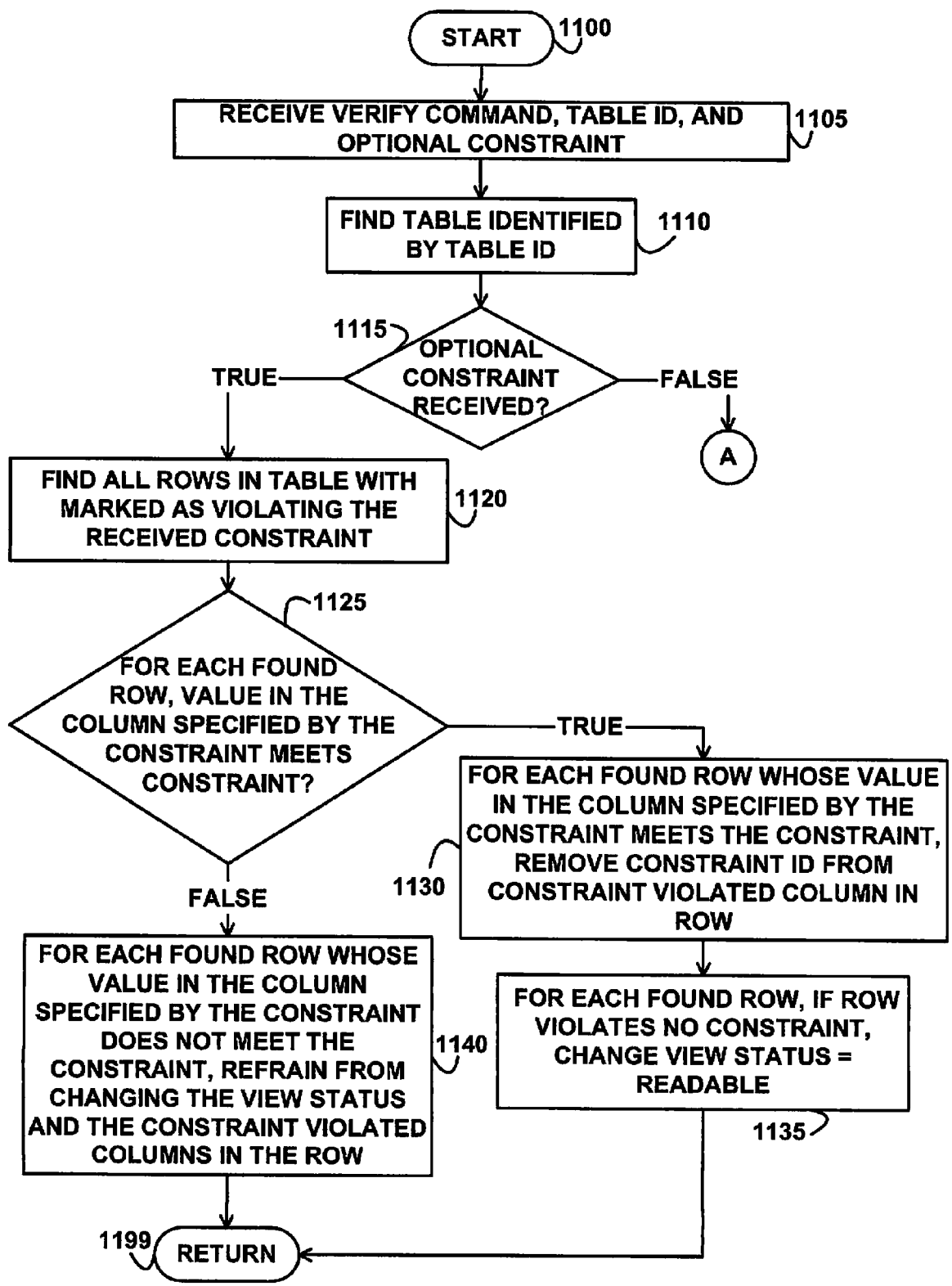
FIG. 11 depicts a flowchart of example processing for verifying data in a table, according to an embodiment of the invention.
Figure 12:
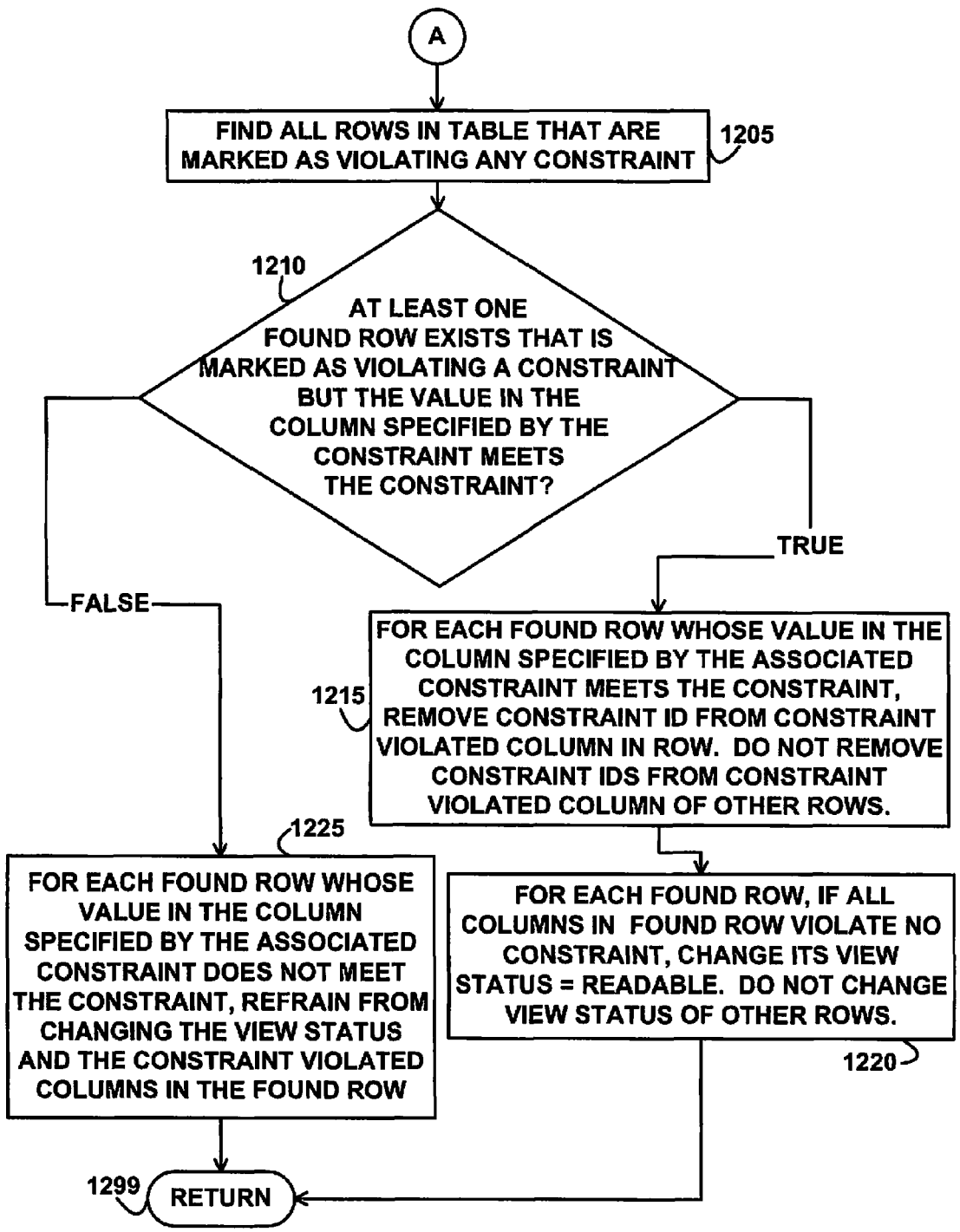
FIG. 12 depicts a flowchart of further example processing for verifying data in a table, according to an embodiment of the invention.

FIGS. 11 and 12 depict flowcharts of example processing for verifying data in a table, according to an embodiment of the invention. Control begins at block 1100. Control then continues to block 1105 where the database management system 152 receives a verify command from the data source 150, such as the example commands 270 and 272 (FIG. 2B). The verify command specifies a table identifier and optionally specifies a constraint.

Control then continues to block 1110 where the database management system 152 finds the table that is identified by the received table identifier. Control then continues to block 1115 where the database management system 152 determines whether the verify command specified the constraint. If the determination at block 1115 is true, then the verify command specified the constraint, and the database management system 152 received the constraint, so control continues to block 1120 where the database management system 152 finds all rows in the table that are marked as violating the received constraint. That is, the database management system 152 finds the rows that have a constraint violated column 348 that identifies a constraint that matches the received constraint, which indicates that the rows are marked as including data values that violate the received constraint.

Control then continues to block 1125 where the database management system 152 determines, for each found row that is marked as violating the constraint, whether the found row includes a data value in the column specified by the constraint that meets the constraint. If the determination at block 1125 is true, then the found row includes a data value in the column specified by the constraint that meets the constraint, so control continues to block 1130 where the database management system 152, for each found row whose value in the column that is specified by the constraint meets the constraint, removes the constraint identifier from the constraint violated column 348 in the found row.

Control then continues to block 1135 where the database management system 152, for each found row whose value in the column that is specified by the constraint meets the constraint, sets the view status 346 to indicate that the row is readable if all the data values in the row do not violate any constraint. If any data value in the row violates any constraint, then the database management system 152 leaves the view status 346 set to hidden. Thus, in an embodiment, for any rows that include data values that violated a previous condition, but now meet or satisfy a new condition that was received, e.g., via an alter command (such as the example alter command 268 of FIG. 2B), the database management system 152 marks those rows as readable. Control then continues to block 1199 where the logic of FIG. 11 returns.

If the determination at block 1125 is false, then either no rows were found or at least one data value in a found row includes a data value in the column specified by the constraint that does not meet the constraint, so control continues to block 1140 where, for each found row whose data value in the column specified by the constraint does not meet the constraint, the database management system 152 does not change the indicator in the view status column and does not change the indicator in the constraint violated column in those rows. Control then continues to block 1199 where the logic of FIG. 11 returns.

If the determination at block 1115 is false, then the verify command did not specify the constraint and the database management system 152 did not receive the constraint, so control continues to block 1205 of FIG. 12 where the database management system 152 finds all rows in the table that are marked (in their respective constraint violated column) as violating any constraint. Control then continues to block 1210 where the database management system 152 determines whether at least one found row exists that is marked in the constraint violated column as violating a constraint but the value in the column specified by the constraint meets or satisfies the constraint.

If the determination at block 1210 is true, then at least one found row exists that is marked in the constraint violated column as violating a constraint but the value in the column specified by the constraint meets or satisfies the constraint, so control continues to block 1215 where, for each found row that is marked as violating a constraint, but the column specified by the constraint includes a value that meets the constraint, the database management system 152 removes the constraint identifier from the constraint violated column 348 in that row. For each found row that is marked as violating a constraint and the column specified by the constraint includes a value that does not meet the constraint, the database management system 152 does not change the constraint violated column 348 in that row. Control then continues to block 1220 where, for each found row that includes a value in the column specified by the constraint that meets the constraint, if all columns in the found row violate no constraint, the database management system 152 changes its view status column 346 to indicate that the row is readable. For each found row that includes a value in the column specified by the constraint that meets the constraint, if at least one column in the found row violates any constraint, the database management system 152 does not change the view status column 346 in the found row. Control then continues to block 1299 where the logic of FIG. 12 returns.

If the determination at block 1210 is false, then all rows in the table that are marked as violating any constraint include values in the column specified by the respective constraint that violate the respective constraint, so control continues to block 1225 where the database management system 152 does not change the view status column 346 or the constraint violated column 348 in any row. Control then continues to block 1299 where the logic of FIG. 12 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
creating a constraint in a storage device for a database table, wherein the constraint specifies a condition for a first column in the database table and an action, wherein the action specifies whether data that violates the condition is allowed to be stored in the first column;
receiving a value and a specification of a second column in the database table from a data source;
if the second column is identical to the first column, if the value that has been received by the receiving but has not yet been stored to the database table violates the condition, and if the action specifies that data that violates the condition is allowed to be stored, storing the value in a row in the database and marking the row in a view status column in the database as hidden, wherein the row comprises the first column and the view status column, wherein a query returns the row if the row is marked as readable in the view status column, and wherein the query does not return the row if the row is marked as hidden in the view status column in the database by the storing in response to the data violating the condition of the constraint; and
in response to a command that specifies the constraint and requests a recommendation for changing the constraint, recommending a change to the constraint that causes the value in the row to satisfy the constraint, wherein the recommending the change to the constraint further comprises searching a plurality of rows that comprise a plurality of values that violate the constraint, wherein the searching finds an extreme value in the plurality of values, wherein the extreme value has a greatest difference from an operand specified by the condition of the constraint and recommending that the operand of the condition be changed to the extreme value, wherein the recommending specifies the extreme value.

2. The method of claim 1, further comprising:
if the second column is identical to the first column, the value violates the condition, and the action specifies that data that violates the condition is not allowed to be stored, refraining from storing the value in the row in the database and returning an error to the data source.

3. The method of claim 2, further comprising:
if the second column is identical to the first column and the value satisfies the condition, storing the value in the second column of the row in the database and marking the row as readable.

4. The method of claim 1, further comprising:
if the second column is identical to the first column, the value violates the condition, and the action specifies that data that violates the condition is allowed to be stored, storing an identification of the constraint that was violated in the row.

5. The method of claim 3, further comprising:
altering the condition into a new condition; and
if the row is marked as hidden, marking the row as readable if the value satisfies the new condition.

6. The method of claim 1, further comprising:
if the second column is not identical to the first column, storing the value in the second column of the row in the database and marking the row as readable.

7. A non-transitory storage medium encoded with instructions, wherein the instructions when executed comprise:
creating a constraint for a database table, wherein the constraint specifies a condition for a first column in the database table and an action, wherein the action specifies whether data that violates the condition is allowed to be stored in the first column;
receiving a value and a specification of a second column in the database table from a data source;
if the second column is identical to the first column, if the value that has been received by the receiving but has not yet been stored to the database table violates the condition, and if the action specifies that data that violates the condition is allowed to be stored, storing the value in a row in the database, marking the row in a view status column in the database as hidden, wherein the row comprises the first column and the view status column, and storing an identification of the constraint that was violated in the row, wherein a query does not return the row that is marked as hidden in the view status column in the database by the storing in response to the data violating the condition of the constraint; and
in response to a command that specifies the constraint and requests a recommendation for changing the constraint, recommending a change to the constraint that causes the value in the row to satisfy the constraint, wherein the recommending the change to the constraint further comprises searching a plurality of rows that comprise a plurality of values that violate the constraint, wherein the searching finds an extreme value in the plurality of values, wherein the extreme value has a greatest difference from an operand specified by the condition of the constraint and recommending that the operand of the condition be changed to the extreme value, wherein the recommending specifies the extreme value.

8. The non-transitory storage medium of claim 7, further comprising:
deleting all of a plurality of rows in the database table that comprise a plurality of values that violate the constraint.

9. The non-transitory storage medium of claim 7, further comprising:
if the second column is identical to the first column and the value violates the condition, refraining from storing the value in the row in the database and returning an error to the data source if the action specifies that data that violates the condition is not allowed to be stored; and
if the second column is identical to the first column and the value satisfies the condition, storing the value in the second column of the row in the database and marking the row as readable, wherein the query returns the row that is marked as readable.

10. The non-transitory storage medium of claim 9, further comprising:
altering the condition into a new condition; and
if the row is marked as hidden, marking the row as readable if the value satisfies the new condition.

11. A computer system comprising:
a processor; and
memory communicatively connected to the processor, wherein the memory encodes instructions that when executed by the processor comprise:
creating a constraint for a database table, wherein the constraint specifies a condition for a first column in the database table and an action, wherein the action specifies whether data that violates the condition is allowed to be stored in the first column,
receiving a value and a specification of a second column in the database table from a data source,
if the second column is identical to the first column, if the value that has been received by the receiving but has not yet been stored to the database table violates the condition, and if the action specifies that data that violates the condition is allowed to be stored, storing the value in a row in the database, marking the row in a view status column in the database as hidden, wherein the row comprises the first column and the view status column, and storing an identification of the constraint that was violated in the row, wherein a query does not return the row that is marked as hidden in the view status column in the database by the storing in response to the data violating the condition of the constraint, and
in response to a command that specifies the constraint and requests a recommendation for changing the constraint, recommending a change to the constraint that causes the value in the row to satisfy the constraint, wherein the recommending the change to the constraint further comprises searching a plurality of rows that comprise a plurality of values that violate the constraint, wherein the searching finds an extreme value in the plurality of values, wherein the extreme value has a greatest difference from an operand specified by the condition of the constraint and recommending that the operand of the condition be changed to the extreme value, wherein the recommending specifies the extreme value.

12. The computer system of claim 11, wherein the instructions further comprise:
altering the condition into a new condition; and
if the row is marked as hidden, marking the row as readable if the value satisfies the new condition.

13. The computer system of claim 11, wherein the instructions further comprise:
deleting all of a plurality of rows in the database table that comprise a plurality of values that violate the constraint.

14. The computer system of claim 11, wherein the instructions further comprise:
   in response to the receiving, determining whether the second column is identical to the first column and the value satisfies the condition, wherein the determining whether the value satisfies the condition further comprises determining whether the value exists in a parent column of a parent table, wherein the first column comprises a foreign key, the condition specifies a parent table, and a parent column in the parent table matches the foreign key.

15. The computer system of claim 11, wherein the instructions further comprise:
   in response to the receiving, determining whether the second column is identical to the first column and the value satisfies the condition, wherein the determining whether the value satisfies the condition further comprises substituting the value for a variable in the condition and evaluating truth of the condition.

* * * * *